United States Patent [19]
Munekata

[11] Patent Number: 4,935,733
[45] Date of Patent: Jun. 19, 1990

[54] REMOTE CONTROLLED SWITCH

[75] Inventor: Mitsuo Munekata, Tokyo, Japan

[73] Assignee: Toshio Hayashi, Torrance, Calif.

[21] Appl. No.: 142,134

[22] Filed: Jan. 7, 1988

[51] Int. Cl.[5] .......... H04Q 9/16
[52] U.S. Cl. .......... 340/825.57; 340/825.72
[58] Field of Search .......... 340/825.57, 825.63, 340/825.71, 825.72, 825.44, 825.69; 367/197; 455/600, 603; 358/194.1; 307/118

[56] References Cited

U.S. PATENT DOCUMENTS

| | | | |
|---|---|---|---|
| 4,514,732 | 4/1985 | Hayes, Jr. | 340/825.57 |
| 4,621,992 | 11/1986 | Angott | 340/825.72 |
| 4,788,542 | 11/1988 | Tanabe | 340/825.69 |

FOREIGN PATENT DOCUMENTS

| | | | |
|---|---|---|---|
| 3233729 | 3/1984 | Fed. Rep. of Germany | 340/825.72 |
| 2130053 | 10/1983 | United Kingdom | 340/825.72 |

*Primary Examiner*—Donald J. Yusko
*Assistant Examiner*—Dervis Magistre
*Attorney, Agent, or Firm*—Natan Epstein; William H. Pavitt, Jr.

[57] ABSTRACT

A remote control receiver responds to a coded signal from a transmitter by actuating a switch that in turn acts to deliver power to a load or device connected to it. This switch responds not to one specific signal using a particular format, but instead it acts in response to any existing signal originating from any of a plurality of remote control transmitters. This switch, therefore, allows a remote control transmitter intended solely for activating and controlling a single device to control any such device provided the switch is attached to it in the manner disclosed.

6 Claims, 4 Drawing Sheets

FIG. 1
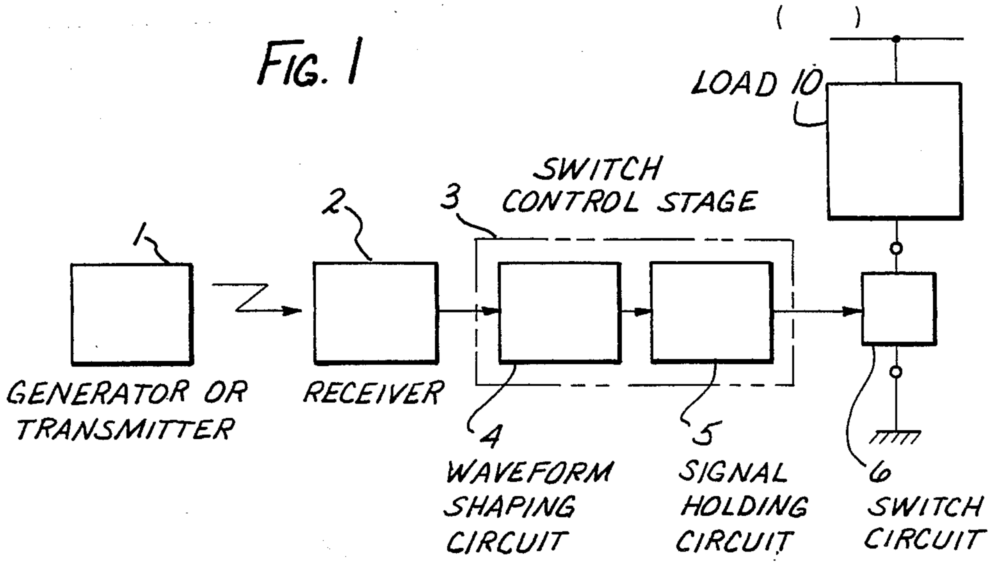
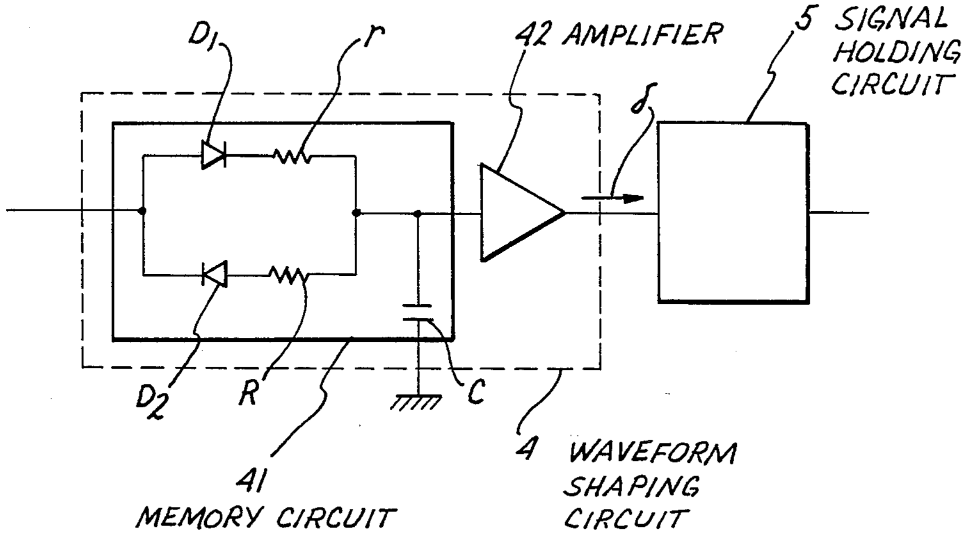
FIG. 2

FIG. 6
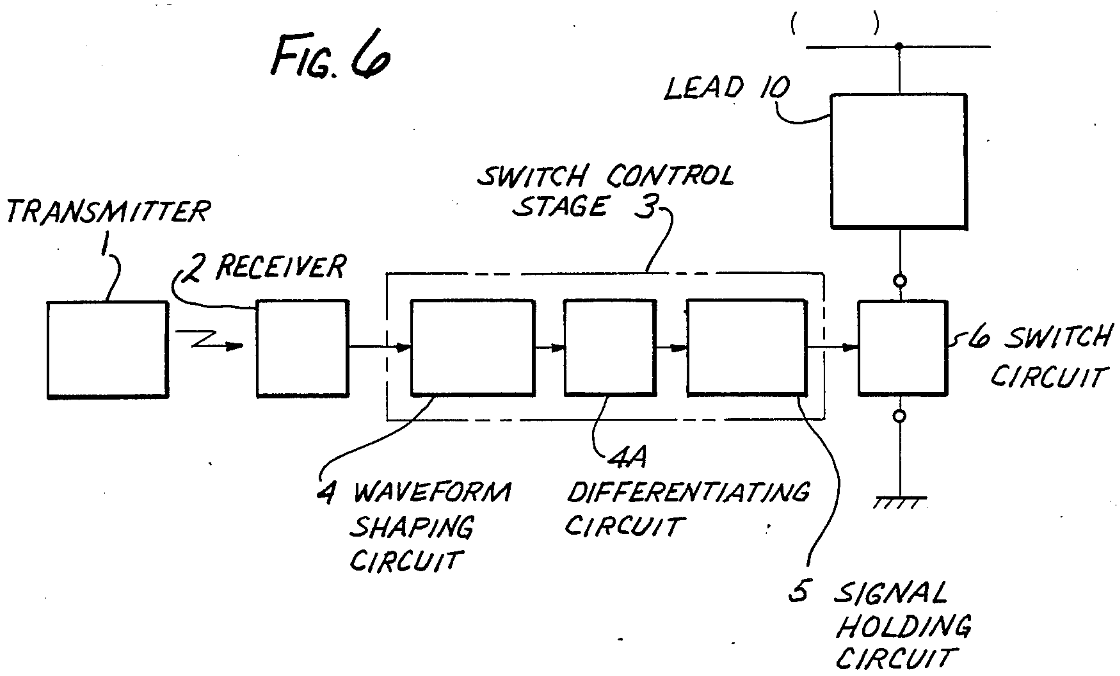
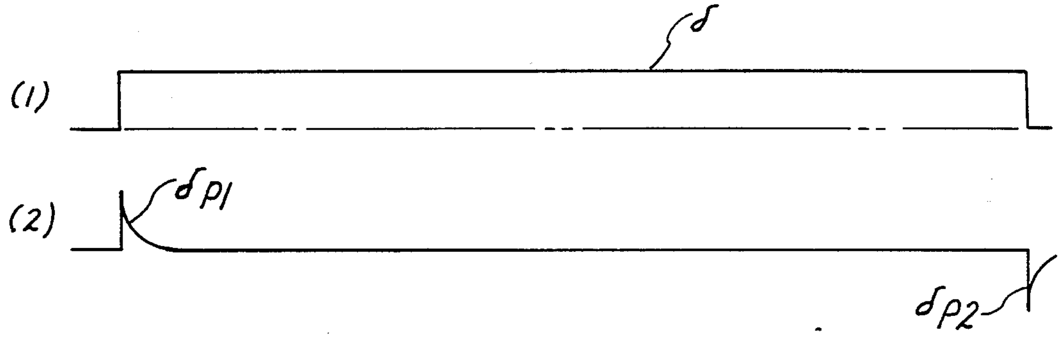
FIG. 7

REMOTE CONTROLLED SWITCH

BACKGROUND OF THE INVENTION

1. Field of the Invention

The present invention pertains generally to the field of electrical control systems and more particularly relates to a remote controlled switch adapted to respond to a cyclic pulse coded control signal adapted to normally control the operation of a first device, such as a hand-held television infrared remote control transmitter.

2. State of the Prior Art

In recent years, remote control devices using infrared rays have become widespread. Due to the advanced signal processing technique and pulse coding of the control signals, these devices can accurately and rapidly remotely control different types and numbers of equipment in the same location without causing them to interfere with each other.

In conventional applications, however, as the number of remotely controlled devices increases, each of them requires a separate remote control signal generator or transmitter because interchangability among the pulse coded transmitter units is not generally available, and consequently control of the multiple devices becomes complicated.

It is therefore desirable to provide a remote controlled switch device which controls power to a particular load or device in response to any one of multiple but similar control signal transmissions, such as infrared transmissions, even though the transmitted signals are generated by different transmitter units, thus reducing the number of transmitter units necessary to control multiple devices.

More particularly, what is desirable is to provide a remote control receiver which is responsive to one or more existing remote control transmitter units which emit pulse coded control signals such as the cyclic pulse sequences characteristics of television infrared remote control transmitters wherein the control signal consists of pulse cycles, each cycle including a repeating custom pulse code and a variable data pulse code.

SUMMARY OF THE INVENTION

The aforementioned objective is achieved by the present invention which provides a remote control receiver which responds to the ouput of a transmitter unit by actuating a switch which in turn, can control power to a device or load connected to the same. The switch is responsive to a pulse coded signal, but it is independent of and insensitive to the variable pulse coded data content of the control signal. As a result, a single remote control transmitter unit originally intended for controlling a first device, can be also used to independently control a second device such as for example, a lighting fixture connected to the novel remote controlled switch. Further, the switch of this invention can be actuated by any of several existing remote control transmitter units each originally intended to control only a particular corresponding device, so long as the various transmitter units emit sufficiently similar control signals as will be apparent from the detailed description below.

BRIEF DESCRIPTION OF THE DRAWINGS

FIG. 1 is a block diagram of a first application of the present invention;

FIG. 2 is a circuit diagram showing the waveform shaping stage in FIG. 1;

FIG. 3-1 shows a typical pulse coded control signal such as may be transmitted by the infrared transmitter unit 1 in FIG. 1;

FIG. 3-2 shows the waveform derived by the waveform shaping stage of FIGS. 1 and 2;

FIG. 3-3 shows the constant amplitude output signal derived by the signal holding stage in FIGS. 1 and 2 for actuating the power switch;

FIG. 6 is block diagram of a third exemplary application of this invention;

FIGS. 7-1 and 7-2 show waveforms derived in the system of FIG. 6.

DETAILED DESCRIPTION OF THE INVENTION

APPLICATION EXAMPLE 1

In FIG. 1, numeral 1 denotes the remote control transmitting device which generates a prescribed optical signal such as infrared rays, and 2 is the receiving circuit comprising, for example, a photo transistor sensor for detecting the transmitted signal and converting the same to an electrical signal.

Figure 3:
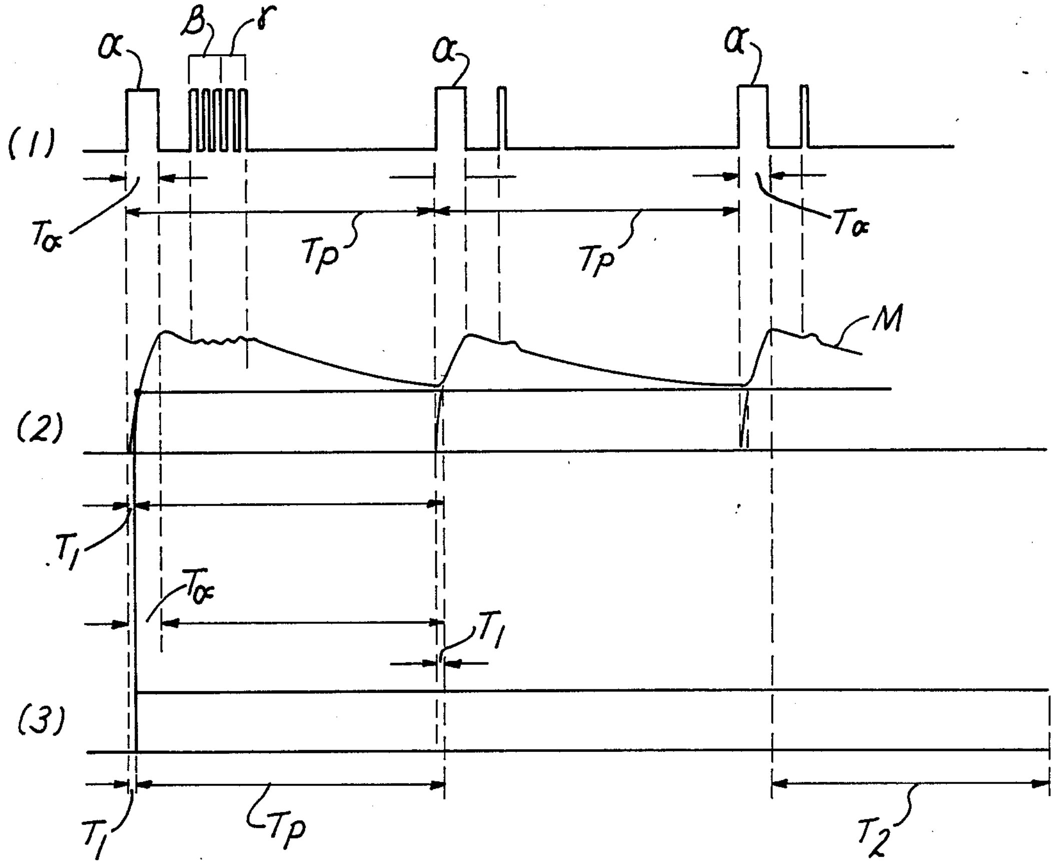

In this example, transmitter 1 generates an infrared pulse coded signal corresponding to the signal shown in FIG. 3-1 including a reader code alpha. The output timing T alpha of this reader code alpha is 9 ms and the cyclic period Tp=108 ms. Also, the beta portion indicates a typical custom code pulse sequence and gamma portion indicates a typical data code pulse sequence. Each of these codes possesses prescribed control details for a specific object to be controlled. (For instance, the channel selection code of the TV receiver).

Receiver 2 transforms the optical signal into the electrical signal shown in FIG. 3-1 and outputs it to the Switch Control Stage.

In this example, the Switch Control Stage 3 consists of the Waveform Shaping Circuit 4 and the Signal Holding Circuit 5. Of these, the Waveform Shaping Circuit 4 consists of the memory circuit 41 and the amplifier 42, as shown in FIG. 2.

The memory circuit 41 includes a first series circuit of diode D1 and resistor r which constitute a part of the charging circuit for the capacitor C and a second series circuit of diode D2 and resistor R which constitute the discharge circuit for the capacitor C. These charge and discharge circuits are connected mutually in parallel between the capacitor C and the opto-sensor as shown in the figure. The output waveform of these circuits is shown in FIG. 3-2 for the pulse coded signal input of FIG. 3-1 mentioned above.

In FIGS. 3-2 and 3-3, T1 is the capacitor charge time (T1=r.c(sec)) and T2 is the memory holding time (T2=R. C(sec)) during the capacitor discharge time which results in a stretching of the custom code pulse portion of each cycle of the input signal. T1 is made longer than the individual pulse width (0.5 ms) of the aforementioned custom code and data code, but shorter than the pulse width (9 ms) of the reader code pulse T alpha. For this reason, the memory circuit 41 in this application succussively integrates and retains the input signal and thereby outputs a waveform M characterized by the reader code T alpha. The amplifier section 42 which receives the output waveform M from the memory circuit 41 functions as an amplifier which sets the signal to a specified level. In other words, the signal, which is amplified by the amplifier 42, and waveform corrected, becomes the waveform delta as in FIG. 3-3 and sent into the Signal Holding Circuit 5.

The memory holding time T2 is set longer than Tp−(T alpha−T1) with respect to the period (108 ms) of the reader code T alpha.

When T1=0, T2>Tp−T=108−9=99 (ms). In this case, by receiving a repetition of the reader code T alpha, the output of the amplifier 42 is not interrupted even if the signal input is a repetition of the 108 (ms) periods, and becomes a one shot output which has a width proportionate to the combined width of the number of input cycles. For this reason, the amplifier 42 is not affected even if the aforementioned memory circuit 41 receives and stores numerous custom codes or data codes. As a result, when the signal received by the receiver 2 is not the same as alpha, no signal is generated from Waveform Shaping Circuit 4, and the misfunction caused by noise is almost completely eliminated. Also, the appropriate upper limit of T=2 was experimentally found to be the manual reaction speed of 200 to 500 (ms) of the operator.

In this application, the aforementioned Signal Holding Circuit 5 is made up of a flip-flop circuit which is set ON or OFF by the rise time of the input signal. The output of this Signal Holding Circuit 5 is sent to the Switch Circuit 6 as the output of the Switch Control Stage 3, and functions to turn the power circuit "on" or "off" for the Load 10.

Figure 4:
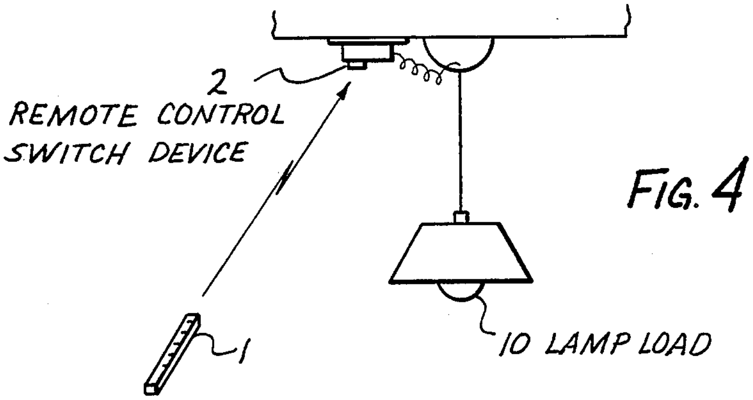
FIG. 4 illustrates a typical application of the remote controlled switch installed for controlling a ceiling lamp fixture.

As shown in Application Example 1, there is the advantage that the electric circuit of the lamp load 10 can be easily turned off or on, as shown in FIG. 4, when Transmitter 1 generates infrared rays, even if the infrared ray signal contains numerous different data intended for other equipment, since the initially received signal contains infrared rays only.

APPLICATION EXAMPLE 2

Figure 5:
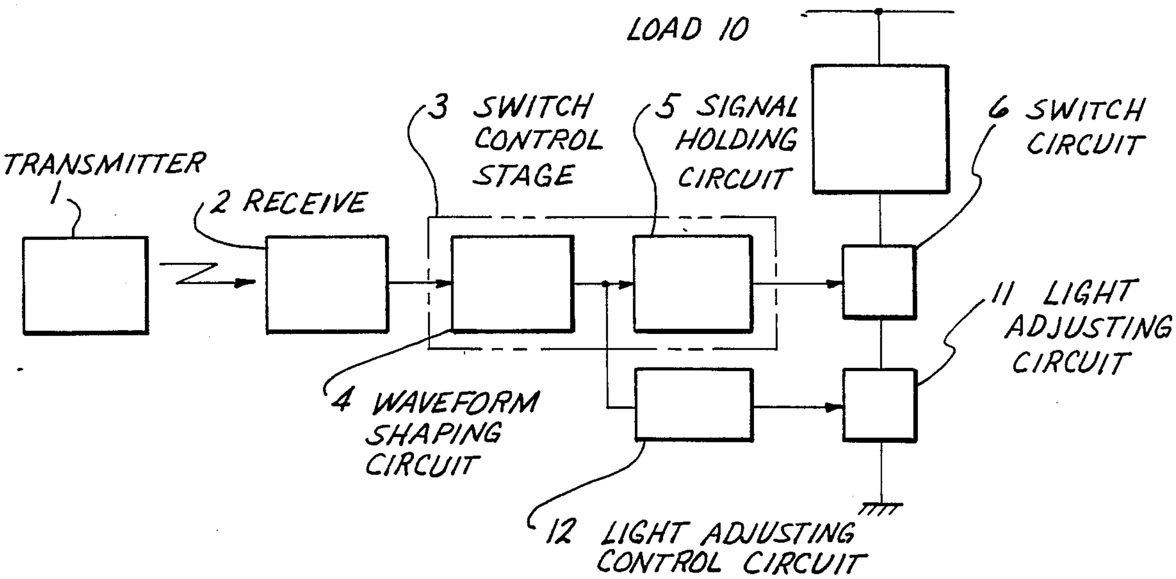
FIG. 5 is block diagram of a second exemplary application of this invention.

Application Example 2 is explained by referring to FIG. 5. In this application, the lamp load shown in FIG. 4 becomes the Load 10 of FIG. 1 and a Light Adjusting Circuit 11 is connected in series with the Switch Circuit 6, and the Light Adjusting Control Section 12 is made to change according to the length of the output signal delta of the aformentioned Waveform Shaping circuit 4. Other portions of the system are the same as those shown in FIG. 1.

Even with the added circuits, the circuit functions in manner similar to that of Application Example 1 and has the advantage of being able to control the light level repeatedly once the lamp is on.

APPLICATION EXAMPLE 3

Application Example 3 will be explained with reference to FIG. 6 and FIG. 7.

This application interposes a Differentiating Circuit 4A between the Waveform Shaping Circuit 4 and Signal Holding Circuit 5 in the Application Example 1 . The output from the Differentiating Circuit 4A becomes pulses delta p1 and delta p2 as shown in FIG. 7-2. The rectangular wave delta of FIG. 7-1 is the output of Waveform Shaping Circuit 4.

The rest of the system is the same as that of Application Example 1.

Even with these changes, the circuit possesses the same functional capability as the Application Example 1.

In application example 1, the switching of Signal Holding Circuit 5 was shown using the rise timing of signal delta, but the switching of Signal Holding Circuit 5 can also be configured to use the fall timing of signal delta. Also, in the application example 1, the reader code alpha was used, but it is not necessarily required to use reader code alpha. If the function is similar, other signals may be use to activate Waveform Shaping Circuit 4.

What is claimed is:

1. A remote control infrared receiver for use with a remote control infrared transmitter characterized by a cyclic control signal in which each cycle includes a reader code and a user selectable variable custom and data code for actuating one of several possible functions in a first controlled device, comprising:

memory circuit means for stretching the reader pulse code and shaper circuit means for converting said stretched pulse to an output signal;

wherein said memory circuit means comprises capacitor charging means and capacitor discharge means driving said shaper circuit means, said discharge means having a discharge time greater than the interval between reader code pulses in successive cycles; and wherein said shaper circuit means comprises amplifier means for deriving a constant amplitude output of duration greater than the cycle time of said control signal;

whereby said cyclic pulsed control signal is converted by said receiver to a constant amplitude pulse of minimum duration greater than said cycle time independently of the pulse coding content of the received signal; and switch means selectively responsive to a signal having said minimum duration.

2. A remote control receiver comprising:

sensor means for detecting a transmitted control signal;

switch means for controlling power to a load;

said switch means actuated by an input voltage in excess of a given level and of a minimum duration; and circuit means connected between said sensor means and said switch means for converting a pulse coded signal having variable pulse coded content sensed by said sensor means to said input voltage of amplitude and duration sufficient for actuating said switch means irrespective of the pulse coded content of said coded signal.

3. The receiver of claim 2 wherein said pulse coded signal is a cyclic signal each cycle including a plurality of code pulses and wherein said circuit means comprise amplifier means having an output connected for actuating said switch means, capacitor means connected to an input of said amplifier means, first means connected to said sensor means for charging said capacitor means and second means for discharging said capacitor, said first and second means characterized by time constants such that said amplifier means is driven responsive to a portion of each said cycle to an output of amplitude sufficient to actuate said switch means and duration in excess of said pulse code cycle, whereby different transmitted pulse code cycles of said pulse coded signal are all converted to the same output signal for actuating said switch means.

4. A remote control infrared receiver for use with a transmitter characterized by a cyclic control signal in which each cycle includes a repeating reader code and a variable data code intended to control operation of a multiplicity of functions in a first device, comprising:

infrared sensor means for detecting the transmitted control signal;

switch means for controlling power to a second device, said switch means actuatable by a control voltage in excess of a given level and of a minimum duration; and amplifier means having an output connected for actuating said switch means, capacitor means connected to an input of said amplifier means, first means connected to said sensor means for charging said capacitor means and second means for discharging said capacitor, said first and second means characterized by time constants such that said amplifier means is driven responsive to said repeating reader code portion of said pulse cycle to an output of amplitude sufficient to actuate said switch means and duration is excess of said pulse code cycle, whereby a plurality of transmitted pulse code cycles of said pulse coded signal are converted to constant level signal of duration greater than said variable data code portion of each said cycle for acturating said switch means irrespective of the variable data coded content of said pulse code cycles.

5. The receiver of claim 4 wherein said first means comprise first diode means and first resistor means connected in series between said sensor means and said capacitor means for charging said capacitor means, and said second means comprise second diode means and second resistor means likewise mutually in series but in parallel with said first diode means and first resistor means for discharging said capacitor means, said capacitor means defining with said second resistor means a time constant substantially greater than with said first resistor means.

6. A remote comtrol receiver for use with a remote control transmitter emitting a pulse coded control signal characterized by a cyclic pulse sequence adapted to control a first device, said receiver comprising:

integrating circuit means for integrating said pulse code sequence having variable pulse code sequences to a given output waveform having a duration greater than the pulse sequence cycle time, and switch actuating means driven by said waveform for controlling a second device responsively to said control signal but independently of said variable pulse code sequences.

* * * * *